Figure 1:
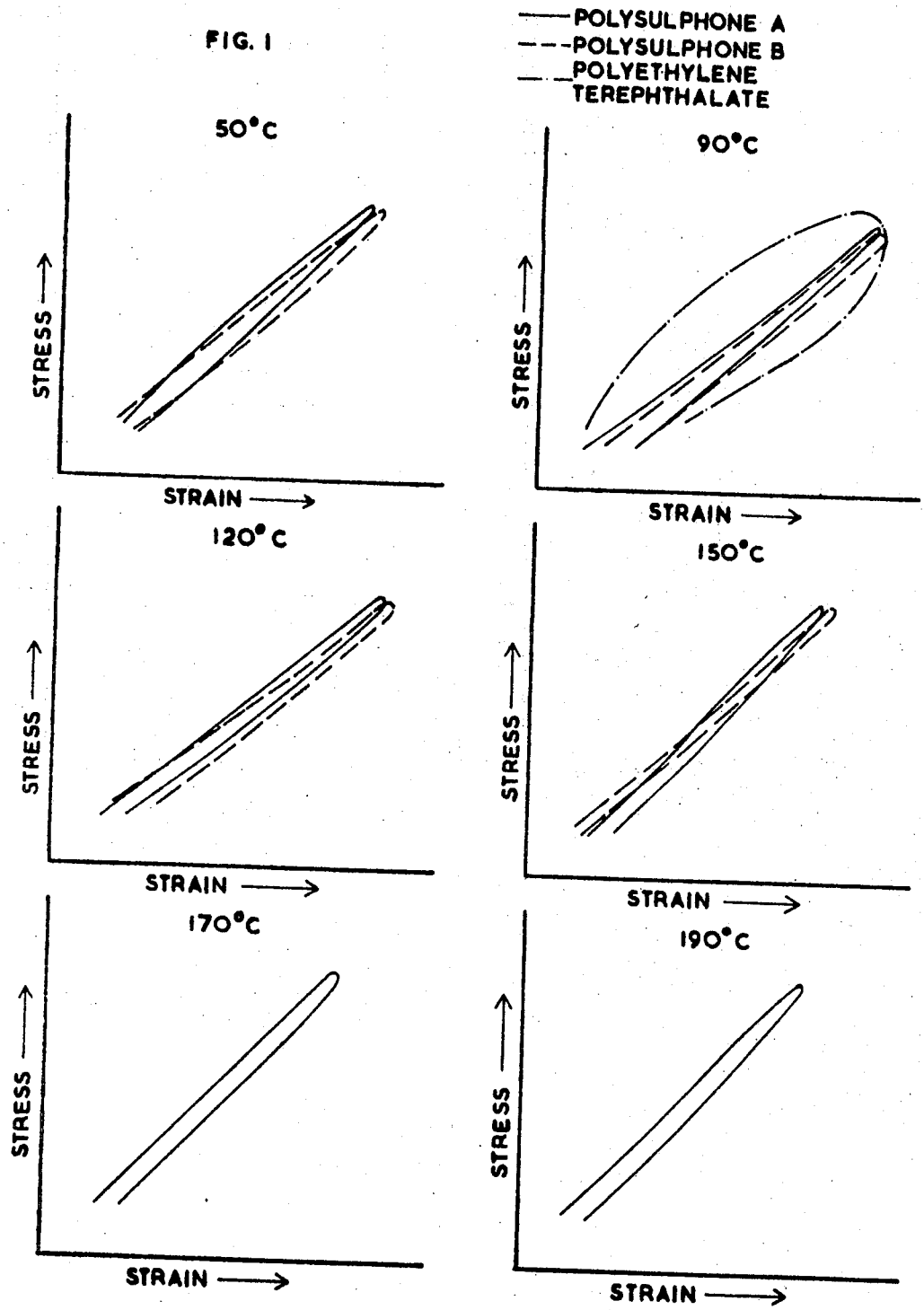

United States Patent
Sherrard-Smith

[11] 3,811,165
[45] May 21, 1974

[54] CALENDER ROLLS

[75] Inventor: Kenneth Irwin Sherrard-Smith, Welwyn Garden City, England

[73] Assignee: Imperial Chemical Industries Limited, London, England

[22] Filed: July 24, 1972

[21] Appl. No.: 274,426

[30] Foreign Application Priority Data
July 30, 1971 Great Britain.................... 35974/71

[52] U.S. Cl. ............................................. 29/132
[51] Int. Cl. ............................................ B21b 31/08
[58] Field of Search......................... 29/125; 260/49

[56] References Cited
UNITED STATES PATENTS
2,801,461    8/1957    Kusters ........................... 29/125 X
3,111,742    11/1963    Lakin ................................. 29/125
3,291,039    12/1966    Christie........................... 29/125 X
3,367,008    2/1968    Hoge................................... 29/125

FOREIGN PATENTS OR APPLICATIONS
1,109,842    4/1968    Great Britain....................... 260/49

*Primary Examiner*—Alfred R. Guest
*Attorney, Agent, or Firm*—Cushman, Darby and Cushman

[57] ABSTRACT

Calender roll made from a rigid core on to which are assembled a plurality of discs of an aromatic polysulphone film held together in axial compression.

9 Claims, 2 Drawing Figures

—— POLYSULPHONE A
— — — POLYSULPHONE B
— — POLYETHYLENE TEREPHTHALATE

CALENDER ROLLS

This invention relates to calender rolls and in particular to such rolls made from a plurality of discs of thermoplastic film assembled on to a rigid core. Such calender rolls are of use in calendering sheet materials, particularly paper, to give a high quality surface finish.

One of the limitations of such rolls is that in use they become heated and this leads to failure, by fusion or degradation of the thermoplastic material from which the discs are made. The amount of heating is dependent, inter alia, on the mechanical hysteresis loss factor of the material. While biaxially oriented polyester film has a relatively low hysteresis loss factor we have found that aromatic polysulphone films have a far lower hysteresis loss factor. In addition aromatic polysulphones generally have higher softening points than polyesters and are more resistant to thermal decomposition and degradation and so can withstand higher working temperatures.

Accordingly we provide a calender roll comprising a plurality of discs made from a film of an aromatic polysulphone fitted on to a core and held in axial compression thereon.

By the term aromatic polysulphones we mean materials containing repeating units of the formula $$-Ar-SO_2-$$

in which Ar is a bivalent aromatic radical and may vary from unit to unit in the polymer chain (so as to form copolymers of various kinds). Thermoplastic polysulphones generally have at least some units of the structure $$-C_6H_4-Y-C_6H_4-SO_2-$$

in which Y is oxygen or sulphur or the residue of an aromatic diol such as 4,4'-bisphenol. In the formulae herein quoted it is to be understood that the aromatic groups are linked at the 1,4 positions, i.e., at the para position. One example of such a polysulphone has repeating units of the formula $$-C_6H_4-O-C_6H_4-SO_2-$$

(polysulphone A)

another has repeating units of the formula $$-C_6H_4-S-C_6H_4-SO_2-$$

(polysulphone B)

and others (which are commercially available in the United States of America) are said to have repeating units of $$-C_6H_4-SO_2-C_6H_4-O-C_6H_4-C(CH_3)_2-C_6H_4-O-$$

(polysulphone C)

(Union Carbide Corporation) or copolymerised units in various proportions of the formulae $$-C_6H_4-C_6H_4-SO_2-$$

(polysulphone D)

and $$-C_6H_4-O-C_6H_4-SO_2-$$

(polysulphone E)

(Minnesota Mining and Manufacturing Company).

Another thermoplastic polysulphone has repeating units of the formula $$-C_6H_4-C_6H_4-Y-C_6H_4-SO_2-$$

(polysulphone F)

in which Y has the meaning specified hereinbefore. Some of the above polysulphones, but preferably excluding those containing aliphatic hydrocarbon radicals either as linking groups or aromatic ring substituents, may be cross-linked. The polysulphone A is a useful polymer to cross-link in making rolls according to this invention. Conveniently cross-linking may be effected simply by exposing the polysulphone to ionising radiation at temperatures of up to 400° C. Preferably β radiation is used, although α, γ or X rays may be employed if desired. Alternatively the polysulphone may be cross-linked by heating in admixture with elemental sulphur, a sulphide or a disulphide at temperatures between 300° C and 450° C.

The films may be unoriented or oriented if desired. However unoriented films give good results and, since they are isotropic, avoid any problems of anisotropicity in the roll when using oriented films that have not been randomly assembled on to the core.

The films preferably have a thickness of between 12 μm and 800 μm although thicker films may be used when desired. The use of thinner films is uneconomic as too many are required to give the desired length of the calender roll.

The roll is normally used in conjunction with a rigid roll to form a nip through which the sheet material being calendered is passed. To avoid premature failure at the edges of the roll made from the discs of film, the roll made from the discs of film is preferably longer than the rigid roll used in conjunction therewith and the roll made from the discs of film is preferably held in axial compression by washers of diameter greater than or equal to the diameter of the roll forced against the ends thereof.

The relative hysteresis loss factors can be seen from plots of stress against strain obtained by making measurements of stress and strain at increasing values of stress and then at decreasing stress values. For a material having low hysteresis loss the plot obtained at increasing stress levels will be close to that obtained at decreasing stress levels.

In FIG. 1 stress/strain curves are plotted, in arbitrary units, for unoriented films of polysulphones A and C at various temperatures. Also shown is a stress/strain curve at 90° C, in the same units, of a biaxially oriented polyethylene terephthalate film. This shows that the polyethylene terephthalate film has a far greater hysteresis loss than the polysulphone films.

In another experiment, which has been found to give an indication of the relative performance of different materials in calender rolls, samples of the film were subjected to an oscillating strain at an elevated temperature. In this experiment, a sample of the film of 10 cm length 0.5 cm width and 250 μm thickness, is clamped at each end. One clamp is fixed while the other is oscillated longitudinally by 1 mm at a frequency of 1,380 cycles per minute. The film is heated to 80° C.

The residual elongation in the film is measured at intervals. It is desirable that this residual elongation is low and does not increase with time.

Figure 2:
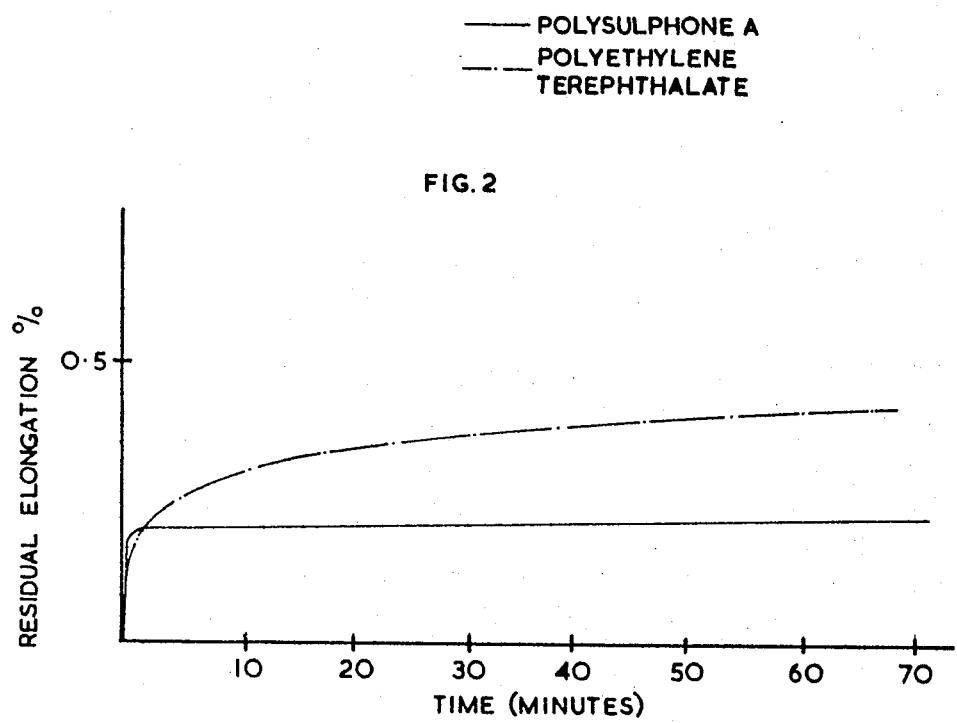

Plots of the residual elongation for biaxially oriented polyethylene terephthalate film and for unoriented film made from polysulphone A are shown in FIG. 2.

It is seen that the residual elongation of the polysulphone film remained constant while that of the polyester film increased with time.

The plot for the polysulphone C fell on the same line as that for polysulphone A.

We have found that the higher the reduced viscosity (as measured on 1 g of the polymer in 100 cm³ of solution in dimethyl formamide at 25°C) the longer the life of the polysulphone film in this test and hence in a calender roll. Preferably the polysulphone has a reduced viscosity 0.47 or greater.

In an example unoriented film of polysulphone A of reduced viscosity 0.47 was used to make a calender roll.

A large number of 15 cm diameter discs having a central 2.5 cm diameter hole of 250 μm thick film were assembled on a steel core and clamped in axial compression thereupon. The roll was used in conjunction with plated steel rolls in a paper supercalender and had a longer life than a similar roll made from discs of biaxially oriented polyethylene terephthalate film.

I claim:

1. A calender roll comprising a plurality of discs made from an unoriented film of an aromatic polysulphone fitted on to a core and held in axial compression thereon.

2. A calender roll according to claim 1 wherein the polysulphone has at least some units of the structure:

-C₆H₄-Y-C₆H₄-SO₂- wherein Y is oxygen, sulphur or an aromatic diol residue and the aromatic groups are linked at the 1,4 positions.

3. A calender roll according to claim 2 wherein the polysulphone has repeating units of the formula -C₆H₄-O-C₆H₄-SO₂- or -C₆H₄-S-C₆H₄-SO₂-

4. A calender roll according to claim 2 wherein the polysulphone has repeating units of the formula

-C₆H₄-SO₂-C₆H₄-O-C₆H₄-C(CH₃)₂-C₆H₄-O-

5. A calender roll according to claim 2 wherein the polysulphone is a copolymer wherein some of the repeating units are of the formula

-C₆H₄-O-C₆H₄-SO₂- and others are of the formula

-C₆H₄-C₆H₄-SO₂-

6. A calender roll according to claim 1 wherein the polysulphone has repeating units of the formula

-C₆H₄-C₆H₄-Y-C₆H₄-SO₂- where Y is oxygen, sulphur or an aromatic diol residue and the aromatic groups are linked at the 1,4 positions.

7. A calender roll according to claim 3 wherein the polysulphone is cross-linked.

8. A calender roll according to claim 1 wherein the polysulphone has a reduced viscosity as measured on 1 g of the polymer in 100 cm³ of solution in dimethyl formamide at 25° C of at least 0.47.

9. A calender roll according to claim 1 wherein the film has a thickness of from 12 μm to 800 μm.

* * * * *

UNITED STATES PATENT OFFICE
CERTIFICATE OF CORRECTION

Patent No. 3,811,165   Dated May 21, 1974

Inventor(s) Kenneth Irving Sherrard-Smith

It is certified that error appears in the above-identified patent and that said Letters Patent are hereby corrected as shown below:

In Figure 1

"POLYSULPHONE B" should read --POLYSULPHONE C--,

Signed and sealed this 4th day of February 1975.

(SEAL)
Attest:

McCOY M. GIBSON JR.
Attesting Officer

C. MARSHALL DANN
Commissioner of Patents